United States Patent Office 3,298,786
Patented Jan. 17, 1967

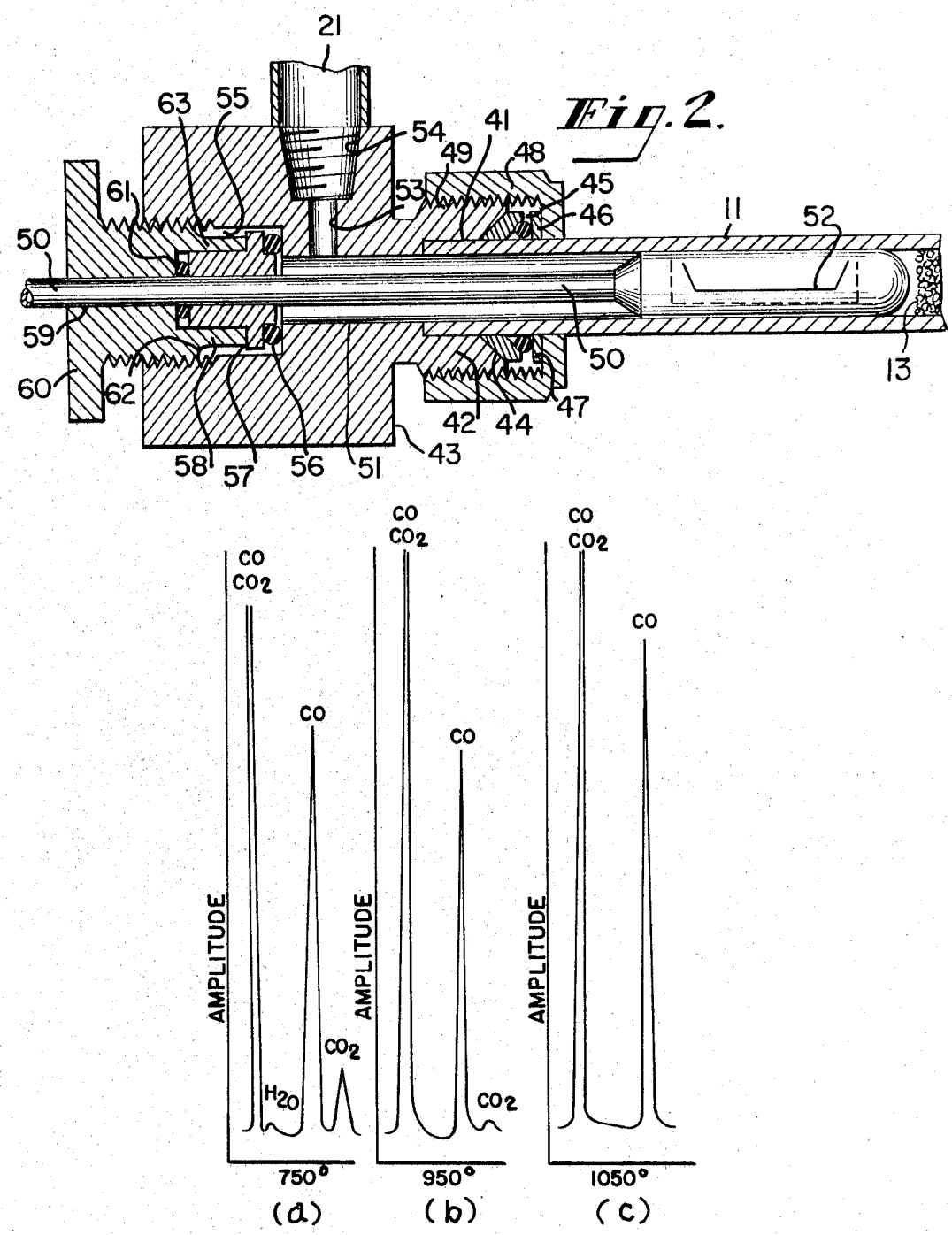

3,298,786
GAS CHROMATOGRAPHIC METHOD AND APPARATUS FOR DETERMINATION OF OXYGEN CONTENT IN ORGANIC SUBSTANCES
Orville N. Hinsvark, Wilmington, Del., assignor, by mesne assignments, to Hewlett-Packard Company, Palo Alto, Calif., a corporation of California
Filed Mar. 4, 1963, Ser. No. 262,518
8 Claims. (Cl. 23—230)

This invention relates to a method and apparatus for chemical analysis and, more particularly, to a method and apparatus for measuring the oxygen content of organic components.

Historically many methods have been available for the determination of oxygen in organic components. Originally, the oxygen content was obtained by subtracting the sum of the other determined elements in a compound from 100% and thereby arriving at a figure for the oxygen content. More recently several more direct methods have been developed which involve directly determining the oxygen content of materials. Various of these methods are described in Chapter 14 of Quantitative Organic Microanalysis, Copyright 1961, Academic Press, Inc.

These various methods have included, among others, the measurement of volume or mass by chemical or physical techniques. Needless to say, many of these methods suffer from the disadvantage that they are not only costly but also time consuming. Another disadvantage of these known methods is that they often require a highly skilled technican in order to obtain reliable data.

Of these known methods the mass determination or gravimetric method is perhaps one of the more common. The gravimetric method is based upon the thermal decomposition of the sample in an inert atmosphere. The resulting decomposition products are then passed over carbon at a relatively high temperature such that virtually all of the oxygen in the decomposed sample is converted to carbon monoxide.

The reaction involving the thermal decomposition of the organic material is expressed by the general formula

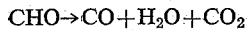

These decomposition products (carbon monoxide, water vapor and carbon dioxide) when passed over activated carbon at a high temperature, usually above 1100° C., are converted to carbon monoxide and free hydrogen. The chemical equations expressing these conversions are:

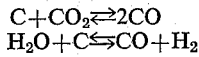

The resulting carbon monoxide then is oxidized to carbon dioxide $CO_2$ by passing the decomposition gases over an oxidizing agent, such as copper oxide, heated to a temperature in the neighborhood of 700 to 800° C. Finally, the carbon dioxide is absorbed or combined with another component and the resultant weighed. For example, the carbon dioxide may be combined with a base such as sodium hydroxide to convert the carbon dioxide to a salt sodium carbonate. The formula expressing this last reaction is:

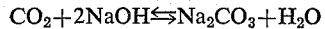

This classical method of analysis, although direct, is often quite difficult to follow because of the instability of the chemical reactions involved. For example, for the reduction of carbon dioxide to carbon monoxide and the conversion of water to carbon monoxide both reactions proceed to the right to form carbon monoxide only at extremely high temperatures. If the temperature falls below 1100° C. the reactions are incomplete and the determinations will be low and inaccurate.

The step in the process involving the oxidation of carbon monoxide to carbon dioxide is more reliable, however, the complete conversion of carbon monoxide to carbon dioxide may still be a problem depending upon
(1) The temperature of the oxidation system.
(2) The activity of the oxidant.
(3) The space velocity of the carbon monoxide gas through the oxidation chamber.

The last step in this gravimetric determination of oxygen, involving the absorption of carbon dioxide, while usually quite reliable because of the small weights typically involved, tends to be somewhat tedious.

It is therefore an object of this invention to obviate many of the disadvantages of the prior art.

Another object of this invention is to provide an improved, quicker, more accurate method of determining the oxygen content of materials.

Still another object of this invention is to provide an improved apparatus for quickly determining the oxygen content of materials.

The method of this invention facilitates the detection of oxygen in organic materials by subjecting a sample of the material to be analyzed to thermal decomposition in an atmosphere of helium, passing the thermal decomposition products into a reduction zone of heated carbon and after reduction is completed, passing the converted or reduced components directly into a chromatograph system where the components are separated and then detected. During the reduction operation virtually all of the decomposition products are converted to carbon monoxide and hydrogen. The chromatograph system separates and detects the carbon monoxide and hence the oxygen content of the sample.

The apparatus of the invention comprises means to heat a sample to be analyzed until it thermally decomposes, a reduction zone and at least one chromatograph separation column. The apparatus is provided with means for introducing the sample into the heating means, means for storing the products of the sample's thermal decomposition, means for introducing carrier gas into the reduction zone after decomposition and reduction is complete, and means for introducing the carrier gas and reduction products into the chromatograph system.

More specifically, the method of the instant invention comprises the steps of subjecting a sample of the material to be analyzed to a high temperature in a furnace or retort in contact with carbon. Means are included for storing the resulting reduction products in a closed loop or expansion system until decomposition of the sample is completed. A carrier gas, such as helium, is then introduced as an eluent and the products are conveyed by the carrier gas out of storage to a dual-column, dual-detection system of a conventional type that is capable of successively separating water vapor from the remaining reduction products and then separating the remaining products. A recording, normally of carbon monoxide, is produced in the form of a chromatogram, from which, the oxygen content of the sample may be determined. In the event that the temperature of decomposition and reduction is too low, water and carbon dioxide will be shown as separate peaks on the chromatogram.

The novel features of this invention as well as the invention itself, both as to its organization and method of operation, will best be understood from the following description, when read in connection with the accompanying drawing(s), in which like reference numerals refer to like parts, in which:

FIGURE 2 is a longitudinal sectional view of a suitable apparatus employed in the injection of a sample to be analyzed; and FIGURE 3 includes three chromatograms illustrating the effect of temperature on the process of conversion of organic oxygen to carbon monoxide in accordance with this invention.

Figure 1:
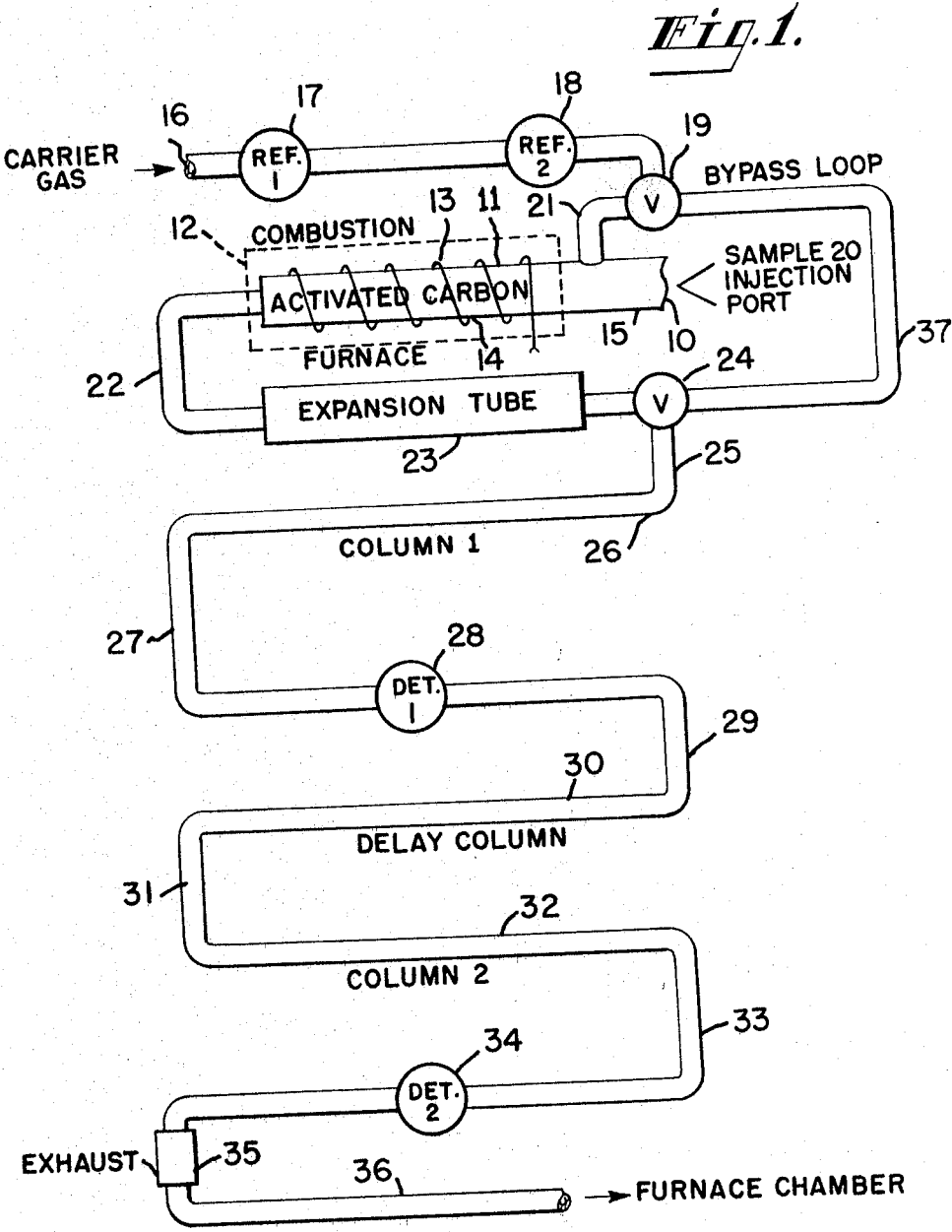
FIGURE 1 is a schematic flow diagram illustrative of the sequential steps of the method and showing schematically the preferred arrangement of the various elements of the apparatus.

Referring to FIG. 1, a sample 20 of the material to be analyzed, is inserted through a sample port 10, to be more fully described hereinafter. The sample is then moved into a reaction chamber or tube 11 contained within a furnace 12, tube 11 being heated by a conventional coil 13. Tube 11 includes a hot, or thermal decomposition zone or portion 14 in furnace 12, packed with granulated carbon 13, and a cold zone or portion 15 exteriorly of the furnace, i.e., to the right as seen in FIG. 1. The sample is initially inserted in the cold portion 15 of the tube 11.

Once introduced into the tube 11, which is maintained at a temperature of at least 1050° C., the organic oxygen in the sample is thermally decomposed into carbon monoxide (CO); water vapor ($H_2O$), and carbon dioxide ($CO_2$). This decomposition is expressed by the equation:

$$CHO \xrightarrow{1100°C} CO + H_2O + CO_2 \quad (1)$$

In the presence of the reducing agent, granulated carbon, the water vapor and carbon dioxide are converted by reduction to carbon monoxide. These reactions are expressed by the equations:

$$C + CO_2 \rightleftharpoons 2CO \quad (2)$$

$$H_2O + C \rightleftharpoons CO + H_2 \quad (3)$$

Although reversible, the reactions, expressed by Equations 2 and 3, proceed quantitatively to the right as long as the temperature is maintained above 1050° C.

A carrier gas, in this instance an inert gas such as helium, is introduced into the system through an inlet 16 from any suitable source and at any desired pressure. The carrier gas passes through the reference side of what is illustrated as a dual-detector, dual-column chromatograph, the dual reference detectors being indicated at 17 and 18.

Any desired converted type dual-column, dual-detector analytical chromatograph may be employed, although that manufactured by the F & M Scientific Corporation of Avondale, Pennsylvania designated as Model 720, is entirely and particularly suitable for the purpose. The use of a dual-detector system permits isothermal operation in the separation and analysis, of the decomposition and conversion products, i.e., hydrogen and carbon monoxide. If the temperature of the reaction chamber is too low, the conversion of the decomposition products to carbon monoxide is incomplete. In this instance, carbon dioxide and water vapor are also present in the decomposition products. Such incomplete conversion is immediately apparent using the method and apparatus of this invention as will be described hereinafter.

A pair of by-pass valves 19 and 24 are adapted to be simultaneously turned either to direct the carrier gas to by-pass or to direct it over the cold sample and the reducing agent as desired. For a purging operation the latter setting is first used and the carrier gas passes through a line 21 to purge both the tube 11 and the sample, the gas (e.g., helium) thence passing through an exit line 22, through an expansion tube 23 and the second by-pass valve 24 to a passage 25 thence to a first separating column 26 and connecting line 27 to a first sensing detector 28. To permit the detection of water as a decomposition and conversion product, it is desirable to utilize the first column to separate the water vapor from the remaining decomposition and conversion products. The detector may be of any desired type. From the detector 28, the carrier gas passes through a drier 29 to remove any water vapor and thence to a delay column 30. This delay column provides improved separation as will be described hereinafter. The gas then passes through a further connection or line 31 to a second separating column 32 and on through a connecting line 33 to a second sensing detector 34. The second column 32 separates the remaining decomposition and conversion products. Finally, it passes through an exhaust line 35. It may then be returned back to the furnace chamber 12 through a return line 36. The latter is shown only fragmentarily.

After the system has been thoroughly purged, by-pass valves 19 and 24 are turned to open a by-pass line 37. Sample 20 is introduced, in a manner to be described below, into the hot zone 14 of tube 11 which is at a temperature sufficient to effect complete thermal decomposition of the sample 20. This temperature usually is as high as approximately 1100° C. or more. It is held there until the decomposition and conversion to carbon monoxide is completed. During this period the gases are stored in the line 22 and the expansion tube 23.

After the reaction is completed, valves 19 and 24 are turned to readmit carrier gas to tube 11, and pass the gas, together with the decomposition and conversion products, through the dual separating columns 26 and 32 and their associated detectors 28 and 34, as previously described. The results preferably are recorded on a chart recorder in a known manner. The first detector 28 senses the components as they elute through the column 26. The second detector 34 senses the remaining components separated by column 32. Recordings are made in a known manner, by interpretation of these recordings, the quantity and quality of carbon monoxide contained in the decomposition products may be determined. Knowledge of the carbon monoxide content permits calculation of the oxygen contained in the sample.

Any desired means may be employed for injecting the sample to be analyzed into the furnace, although a sample injector of the type disclosed in FIGURE 2 has been found to be particularly convenient and desirable. The injector encloses the open end of the decomposition tube 11, which extends into a recess 41 in a boss or flange 42 comprising an integral part of a closure plug 43 closing the end of decomposition tube 11. Flange 42 is internally bevelled as at 44 to provide a frusto-conical recess in which seats a frusto-conical sealing gasket 45. A clamping ring 46 engages an O-ring 47 and holds the same against gasket 45. An internally threaded lock nut 48 engaging external threads 49 on boss 42 holds the parts in properly related packing assembly.

A sample handling device comprises an elongated rod 50 which extends through a bore 51 in plug 43 into tube 11. This rod carries at its right end, as seen in FIGURE 2, a sample boat 52. A suitably threaded inlet tube or pipe may be engaged in the threaded recess 54 for attaching the line 21 to the combustion chamber.

The outer end of bore 51, i.e., the left end as seen in FIGURE 2, is provided with an internally threaded enlarged opening 55. An externally threaded locking or packing plug 60 engages the internal threads of the enlarged opening 55 and is adapted to tightly seal the bore 51. To achieve the seal and yet permit operation of the rod 50, the plug 60 is provided with a bore 59 through which the rod 50 extends. A portion 62 at one end 63 of the bore 59 is enlarged to accept a sleeve 58 bearing a flange 57. Suitable packing, illustrated as an O-ring 56, is held in sealing relation by the flange 57 and the seat of the enlarged opening 55. An additional O-ring 61 seats between the shoulder formed by the internal enlargement 62 of bore 59 and the end of sleeve 58. When under slight compression, ring 61 thus forms a seal around rod 50, preventing axial leakage of gas or vapor along the rod. Enlargement 62 is formed internally of a reduced end portion 63 of the locking plug 60, the end of which abuts the outer side of peripheral flange 57. This applies compression to O-ring 56. A tightly sealed opening is thus provided, by moderate tightening of plug 60, for the end of decomposition tube 11. Thus to introduce a sample, the plug 60 is simply removed and the rod 50 with the boat 52 withdrawn. Next the sample is placed in the boat 52, the rod 50 is reinserted in the decomposition tube 40 and the plug 60 again tightened. From the exterior of tube 11 the rod 50 may be manually, or, if desired, automatically, moved axially to manipulate boat 52 internally of tube 11. An adequate and effective means of introducing solid material for thermal decomposition is thus provided for the accomplishment of the analytical method of the instant invention. Granulated carbon 13 may be packed in one end of the combustion chamber.

FIGURE 3 discloses three typical chromatograms of the decomposition products resulting from the thermal decomposition of an organic sample and the effects of reduced temperature operation thereon. These chromatograms clearly illustrate one of the advantages of this invention, namely, if the conversion of the decomposition products to carbon monoxide is incomplete, this fact may be readily detected.

The first chromatogram is one taken of the decomposition products of an organic sample at a temperature of 750° C.

The first elution peak indicates the combined decomposition components other than water vapor ($H_2O$). The second elution peak indicates the water vapor content of the decomposition products. The third peak, representing the output of the second detector 34, indicates the decomposition products which were converted to carbon monoxide (CO). The fourth peak, also produced by the second detector 34, indicates the carbon dioxide content.

The presence of the water vapor and carbon dioxide immediately denotes that the conversion was incomplete. In this instance the incomplete conversion to carbon monoxide was due to insufficient temperature. It could have been due to spent carbon packing or to various other causes. In any event, the method and apparatus of this invention permit the immediate detection of this incomplete conversion which would result in an inaccurate determination of the oxygen content of the sample.

Note now the effect of an increased temperature for the thermal decomposition and conversion. The second chromatogram shows the decomposition products resulting from operation at 950° C. It may be noted that the water vapor has substantially disappeared and that the amount of carbon dioxide present is reduced. The presence of carbon dioxide still denotes an incomplete conversion. This means the oxygen determination would be inaccurate.

The third chromatogram was taken of the decomposition products produced at a temperature of 1050° C. This chromatogram shows a complete absence of water vapor and carbon dioxide. Substantially all of the decomposition products were converted to carbon monoxide. It is now possible, by conventional analysis of the height and area of the carbon monoxide peak to determine accurately the oxygen present in the sample.

From the foregoing it will now be seen that there is herein provided an improved method of and apparatus for the qualitative and quantitative elemental analysis of the oxygen content of a sample by thermal decomposition and by subsequent gas chromatographic measurements or analysis. This procedure simplifies and accelerates such measurements. They can be carried out quickly, accurately and expeditiously by a relatively unskilled operator. The method and apparatus of this invention represent a considerable improvement over the prior art in that the usual steps of oxidation and absorption of the oxidized components is eliminated.

In carrying out the method of the invention a sample to be analyzed is charged to the combustion zone and thermally decomposed and converted to carbon monoxide in the presence of carbon as hereinbefore described. The products of decomposition and conversion are accumulated continuously into a closed system until the reactions are completed. Thereupon a carrier gas is admitted and the products are swept out of said zone and delivered to the chromatographic separation zone. If anything occurs to prevent the complete conversion of all of the oxygen in the sample to carbon monoxide, this is immediately apparent from the chromatogram.

The carrier gas which can be employed in the method and apparatus of the invention can be any of those normally employed in gas chromatography such as helium and the like.

The chromatographic column component of the apparatus of the invention can be of any desired type and shape. For example, the column can be of glass or other suitable inert material. It may be from 1 to 50 meters or more in length and from 2 or less to 10 millimeters or more in diameter. The tube can be of the capillary type if desired, or it may be packed with suitable inert pulverulent support having a particle size of approximately 1 millimeter or less. Suitable packings are known in the art, such as crushed and screened kieselguhr, Carborundum, Celite or other diatomaceous earth, ground firebrick, or a fluorocarbon polymer sold commercially under the tradename Teflon (polytetrafluoroethylene).

It is obvious that many embodiments may be made of this inventive concept, and that many modifications may be made in the embodiments hereinbefore described. Therefore, it is to be understood that all descriptive matter herein is to be interpreted merely as illustrative exemplary, and not in a limited sense. It is intended that various modifications which might readily suggest themselves to those skilled in the art be covered by the following claims, as far as the prior art permits.

What is claimed is:

1. A method of determining the oxygen content of an organic chemical substance containing carbon, hydrogen, and oxygen comprising the steps of:
   introducing a sample of the substance to be analyzed into a closed, heated reaction chamber having an inert gas atmosphere,
   subjecting the sample to thermal decomposition in the presence of carbon in said closed chamber to yield decomposition products including carbon dioxide, carbon monoxide, and water vapor,
   retaining the decomposition products in said closed chamber until they are reduced by the carbon to reduction products including carbon monoxide and hydrogen gas, whereby substantially all of the oxygen in said sample is converted to carbon monoxide,
   sweeping the reduction products from said chamber as a plug sample with an inert gas,
   passing the reduction products through a chromatographic separating column, and
   detecting changes in the composition of the effluent from said column.

2. The method set forth in claim 1 which includes the additional step of recording changes in the composition of the column effluent.

3. The method set forth in claim 1 in which the inert gas is helium.

4. The method set forth in claim 1 wherein the temperature of said reaction chamber is maintained equal to or greater than 1050° C.

5. The method set forth in claim 1 which includes the additional step of determining the accuracy of the oxygen determination by monitoring the column effluent for the presence of water vapor, such presence denoting incomplete conversion of the oxygen in the sample to carbon monoxide.

6. The method set forth in claim 1 which includes the additional step of determining the accuracy of the oxygen determination by monitoring the column effluent for the presence of carbon dioxide, such presence denoting incomplete conversion of the oxygen in the sample to carbon monoxide.

7. A method of determining the oxygen content of an organic chemical substance containing carbon, hydrogen, and oxygen comprising the steps of:

- introducing a sample of the substance to be analyzed into a closed, heated reaction chamber having a helium atmosphere,
- subjecting the sample to thermal decomposition in the presence of carbon in said closed chamber to yield decomposition products including carbon dioxide, carbon monoxide, and water vapor,
- retaining the decomposition products in said closed chamber until they are reduced by the carbon to reduction products including carbon monoxide and hydrogen gas, whereby substantially all of the oxygen in said sample is converted to carbon monoxide,
- maintaining the temperature of said reaction chamber equal to or greater than 1050° C.,
- sweeping the reduction products from said chamber as a plug sample with helium,
- passing the reduction products through a chromatographic separating column,
- detecting changes in the composition of the effluent from said column, and
- determining the accuracy of the oxygen determination by monitoring the column effluent for the presence of carbon dioxide and water vapor, the presence of either denoting incomplete conversion of the oxygen in the sample to carbon monoxide.

8. In apparatus for determining the oxygen content of an organic substance by gas chromatography including a furnace, a reaction chamber in said furnace, said chamber being at least partially filled with carbon, means for introducing a sample of said organic substance into said chamber, means including said furnace for heating said chamber and sample until it thermally decomposes to yield decomposition products including carbon dioxide, water, and carbon monoxide, means including said carbon for converting substantially all of the oxygen in said carbon dioxide and water into carbon monoxide, means for passing an inert gas through said reaction chamber thereby to remove substantially all of said carbon monoxide therefrom, and a gas chromatographic separating column connected to said reaction chamber for separating said carbon monoxide from all other components, the improvement comprising:

- means for isolating said reaction chamber during thermal decomposition and conversion of the organic substance to carbon monoxide and hydrogen, whereby said decomposition and conversion can occur under static conditions, and
- gas detector means connected to the output of said gas chromatographic separating column for detecting changes in the constituency of said inert gas passing therethrough, thereby to determine accurately the oxygen content of said sample.

References Cited by the Examiner

UNITED STATES PATENTS 3,096,157    7/1963    Brown et al. _____ 23—232

OTHER REFERENCES

Gotz, A., "Eine Schnelle Sauerstoffbestimmung in Organischen Substanzen" (Organisch-analytisches Laboratorium der Knapsack-Griesheim AG, Werk Knapsack bei Koln.), Fresnenius' Zeitschrift fur Analytische Chemie, vol. 181 (1961) pp. 92–100.

Swann, William B., and Dux, James J., "New Technique for Pyrolyzing Samples for Gas Chromatographic Analysis," April, 1961 Analytical Chemistry, vol. 33, No. 4, pp. 654 and 655.

MORRIS O. WOLK, *Primary Examiner.*

H. A. BIRENBAUM, *Assistant Examiner.*